United States Patent [19]

Hayashi

[11] Patent Number: 5,995,134

[45] Date of Patent: *Nov. 30, 1999

[54] METHOD AND APPARATUS FOR ENTICING A PASSIVE TELEVISION VIEWER BY AUTOMATICALLY PLAYING PROMOTIONAL PRESENTATIONS OF SELECTABLE OPTIONS IN RESPONSE TO THE VIEWER'S INACTIVITY

[75] Inventor: Michael T. Hayashi, Aurora, Colo.

[73] Assignee: Time Warner Cable, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/572,540

[22] Filed: Dec. 14, 1995

[51] Int. Cl.$^6$ ........................................................ H04H 7/10
[52] U.S. Cl. .............................. 348/12; 348/10; 348/563; 345/327
[58] Field of Search ................................ 348/1, 7, 10, 12, 348/13, 563; 455/4.2, 5.1, 6.3; 345/327; H04N 9/173

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. . |
| 4,823,386 | 4/1989 | Dumbauld et al. . |
| 4,959,686 | 9/1990 | Spallone et al. ........................ 364/401 |
| 4,991,208 | 2/1991 | Walker et al. . |
| 5,046,090 | 9/1991 | Walker et al. . |
| 5,093,718 | 3/1992 | Hoarty et al. . |

(List continued on next page.)

OTHER PUBLICATIONS

Adams, Michael, "Network Design and Implementation of a large–scale, ATM, Multimedia Network," *Engineer Conference Notes* from NETWORLDsm + INTEROP® 95, Las Vegas, NV (Mar. 27–31, 1995).

Adams, Michael, "Real Time MPEG Asset Delivery over ATM," *NCTA Technical Papers, 1995*:315–326 (1995).

News Release, "Time Warner Introduces World's First Full Service Network in Orlando," TIMEWARNER CABLE Full Service Network, Maitland, FL, 32751 (Dec. 14, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, CO.

Vecchi, Mario P., and Adams, Michael, "Traffic Management for Highly Interactive Transactional System," *NCTA Technical Papers, 1995*:258–266 (1995).

*Primary Examiner*—Michael H. Lee
*Attorney, Agent, or Firm*—Robert G. Crouch; F.A. Sirr; Holland & Hart LLP

[57] ABSTRACT

A method and apparatus for enticing a passive television viewer by automatically playing promotional presentations of selectable options in response to the viewer's inactivity. One embodiment of the invention presents the passive viewer with a set of selectable options. If the viewer does not select an option from the set of selectable options within a predetermined amount of time, the invention then displays a promotional presentation of a first option from the set of selectable options. A more specific embodiment of the invention displays the promotional presentation of the first option by (1) requesting promotional data concerning the first option from a service source through a communication network, and (2) receiving the promotional data from the service source through the communication network.

39 Claims, 11 Drawing Sheets

U.S. PATENT DOCUMENTS

| | | |
|---|---|---|
| 5,168,353 | 12/1992 | Walker et al. . |
| 5,220,420 | 6/1993 | Hoarty et al. . |
| 5,255,267 | 10/1993 | Hansen et al. . |
| 5,311,423 | 5/1994 | Clark . |
| 5,343,239 | 8/1994 | Lappington et al. . |
| 5,357,276 | 10/1994 | Banker et al. . |
| 5,361,091 | 11/1994 | Hoarty et al. . |
| 5,383,112 | 1/1995 | Clark . |
| 5,390,337 | 2/1995 | Jelinek et al. . |
| 5,394,394 | 2/1995 | Crowther et al. . |
| 5,400,402 | 3/1995 | Garfinkle . |
| 5,408,417 | 4/1995 | Wilder .................................... 705/5 |
| 5,412,720 | 5/1995 | Hoarty . |
| 5,421,031 | 5/1995 | De Bey . |
| 5,422,674 | 6/1995 | Hooper et al. . |
| 5,423,555 | 6/1995 | Kidrin . |
| 5,425,027 | 6/1995 | Baran . |
| 5,426,699 | 6/1995 | Wunderlich et al. . |
| 5,442,700 | 8/1995 | Snell et al. . |
| 5,446,726 | 8/1995 | Rostoker et al. . |
| 5,452,297 | 9/1995 | Hiller et al. . |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |
| 5,524,195 | 6/1996 | Clanton, III et al. .................... 395/155 |
| 5,557,658 | 9/1996 | Gregorek et al. .......................... 379/67 |
| 5,635,978 | 6/1997 | Alten et al. ................................. 348/7 |
| 5,659,350 | 8/1997 | Hendricks et al. .......................... 348/6 |

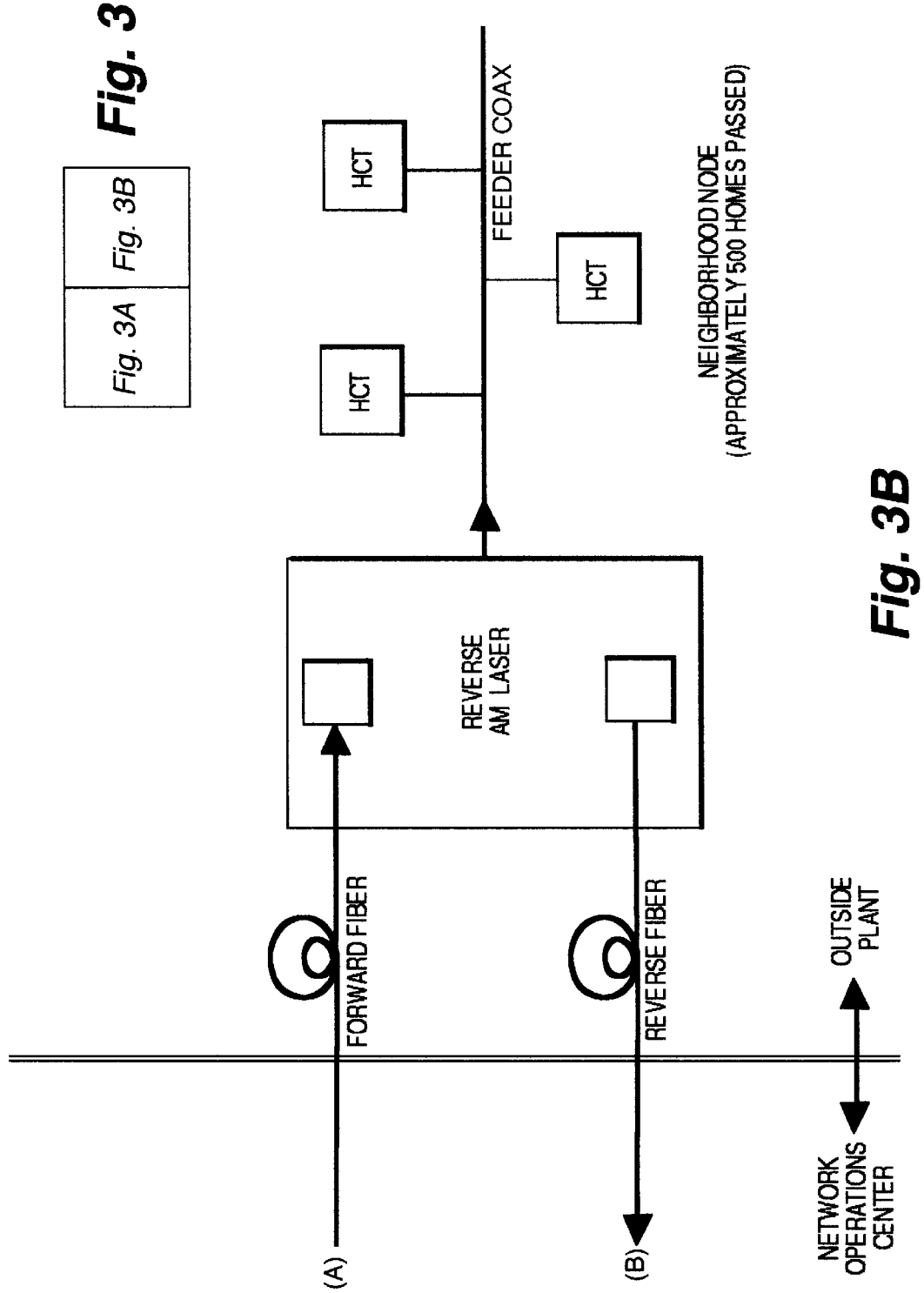

METHOD AND APPARATUS FOR ENTICING A PASSIVE TELEVISION VIEWER BY AUTOMATICALLY PLAYING PROMOTIONAL PRESENTATIONS OF SELECTABLE OPTIONS IN RESPONSE TO THE VIEWER'S INACTIVITY

The present invention is directed towards a method and apparatus for enticing a passive television viewer by automatically playing promotional presentations of selectable options in response to the viewer's inactivity.

BACKGROUND OF THE INVENTION

Traditionally, television has been used as a passive device, that only allows a viewer to control the volume and channel, while reserving control of the content as well as the presentation time and format for the service provider. In recent years, however, a number of interactive systems have been created, in order to enable viewers to use their televisions as interactive devices. Specifically, with the advent of interactive services in the home entertainment field, televisions have become active devices, that allow their viewers greater flexibility and control over the content, the presentation time, and the presentation format of their selected interactive applications.

Interactive systems are useful for those users that will take advantage of them. However, there are those users who will not actively engage their televisions for a number of reasons (such as fear of technology, lack of interest, etc). In such cases, it would be desirable to entice the viewers to take part in the interactive experience (i.e., to purchase or select the selections provided by the interactive systems).

Also, interactive systems that are entertainment oriented, such as Interactive Television, should not be static in nature. In other words, because entertainment oriented systems must be entertaining, interactive systems must provide action on their displays for viewers who do not actively take part in the interactive experience. Consequently, there is a need in the art for a method and apparatus for enticing a passive television viewer by automatically playing promotional presentations of selectable options in response to the viewer's inactivity.

SUMMARY OF THE INVENTION

The invention provides a method and apparatus for enticing a passive television viewer by automatically playing promotional presentations of selectable options in response to the viewer's inactivity. One embodiment of the invention presents the passive viewer with a set of selectable options. If the viewer does not select an option from the set of selectable options within a predetermined amount of time, the invention then displays a promotional presentation of a first option from the set of selectable options. A more specific embodiment of the invention displays the promotional presentation of the first option by (1) requesting promotional data concerning the first option from a service source through a communication network, and (2) receiving the promotional data from the service source through the communication network.

BRIEF DESCRIPTION OF THE DRAWINGS

The novel features of the invention are set forth in the appended claims. However, for purpose of explanation, several embodiments of the invention are described by reference to the following figures.

DETAILED DESCRIPTION OF THE INVENTION

The invention provides a method and apparatus for enticing a passive television viewer by automatically playing promotional presentations of selectable options in response to the viewer's inactivity. In the following description, numerous details are set forth for purpose of explanation. However, one of ordinary skill in the art would realize that the invention may be practiced without the use of these specific details. In other instances, well-known structures and devices are shown in block diagram form in order not to obscure the description of the invention with unnecessary detail.

The invention displays promotional videos of selectable options, if the viewer does not make a selection within a predetermined amount of time after being presented with the selectable options. One embodiment of the invention presents the passive viewer with a set of selectable options. If the viewer does not select an option from the set of selectable options within a predetermined amount of time, the invention then displays a promotional presentation of a first option from the set of selectable options. A more specific embodiment of the invention displays the promotional presentation of the first option by (1) requesting promotional data concerning the first option from a service source through a communication network, and (2) receiving the promotional data from the service source through a dedicated information stream of the communication network.

Figure 1:
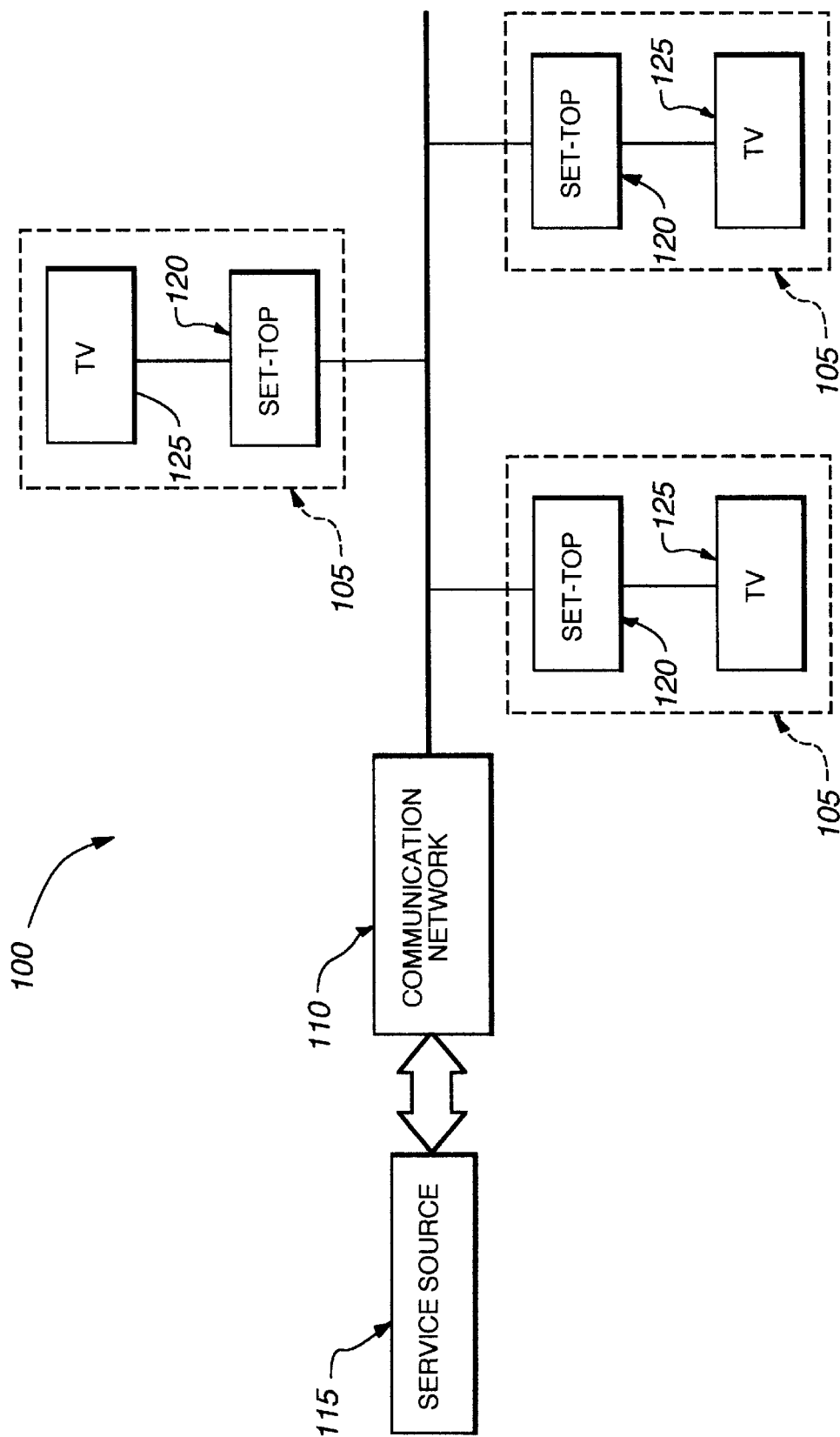
FIG. 1 presents an interactive communication system used by the invention.

FIG. 1 presents an interactive communication system 100 used by the invention. This system includes a number of home terminal nodes 105, a communication network 110, a service source 115. As shown in FIG. 1, each home terminal node 105 includes a set-top terminal 120 and a television 125. Each set-top controls the operation of its corresponding television. In particular, through communication network 110, a set-top (1) establishes a communication link between the television viewer and the service source, (2) presents, via the television, selectable programming options provided by the service source to the viewer, and (3) relays program selections from the viewer to the service source.

Figure 2:
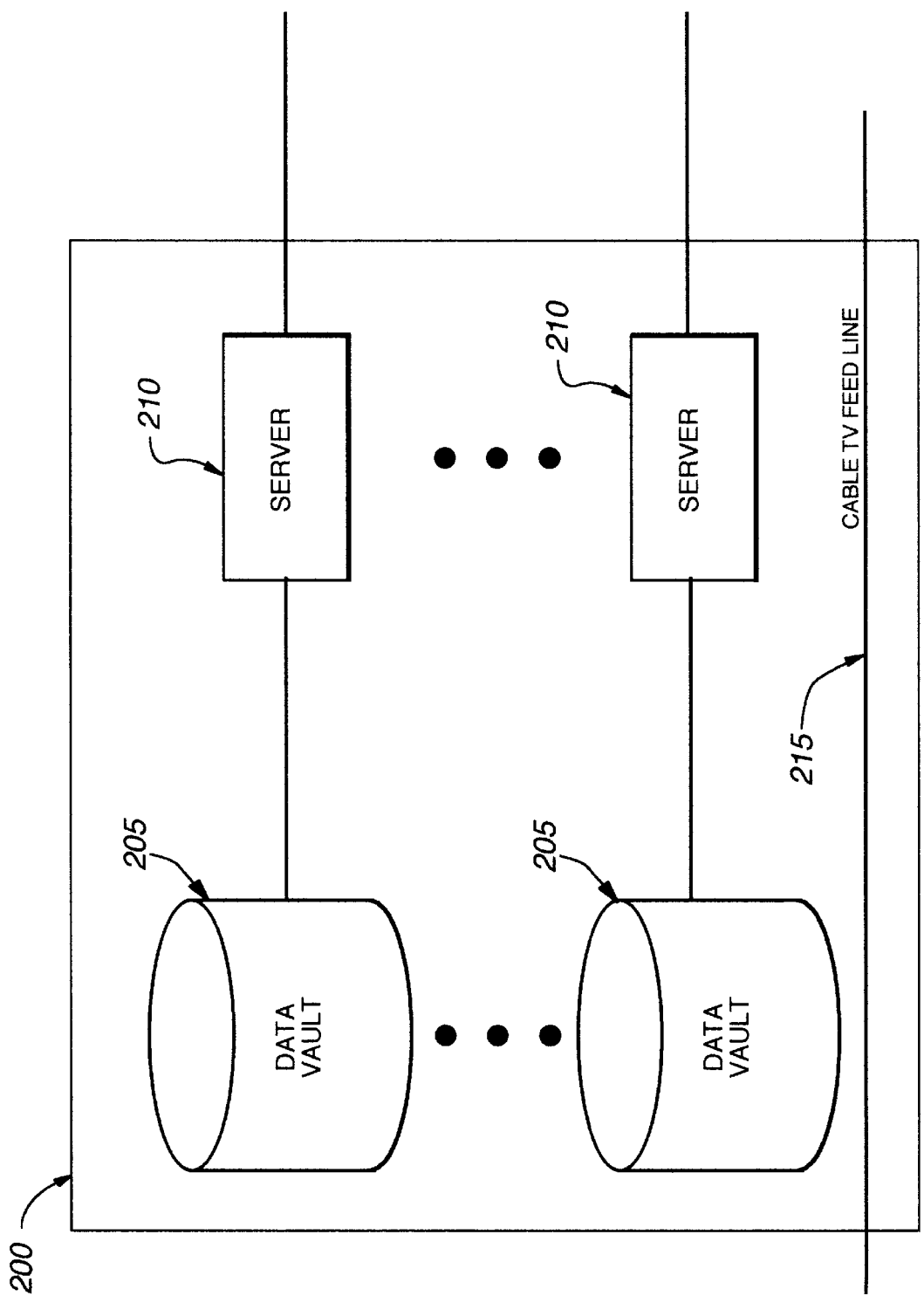
FIG. 2 presents an example of a service source used in the interactive communication system of FIG. 1.

FIG. 2 presents an example of a service source used in the interactive communication system of FIG. 1. As shown in FIG. 2, one example of the service source includes a number of data storage vaults 205, a number of media servers 210, and a cable TV feedline 215. Service source 200 utilizes data storage vaults 205 and media servers 210 to provide a variety of interactive digital services to the subscribers of the system. Specifically, data storage vaults 205 are used to store the digital programming content, and media servers 210 are used to retrieve the stored digital media in response to requests from the home terminal nodes.

The retrieved digital programs can then be transmitted through a shared information stream or a dedicated information stream. A shared information stream is used to transmit data to a number of subscribers, while a dedicated information stream is used to transmit data to a specific user. In addition, an information stream can be assigned all or part of a frequency band used by the network. As further shown in FIG. 2, service source 200 also has a cable feedline 215, which receives cable programming from the local cable company and supplies this programming to the network. The network then broadcasts the cable programming to all of the system's subscribers on shared information streams.

Figure 3A:
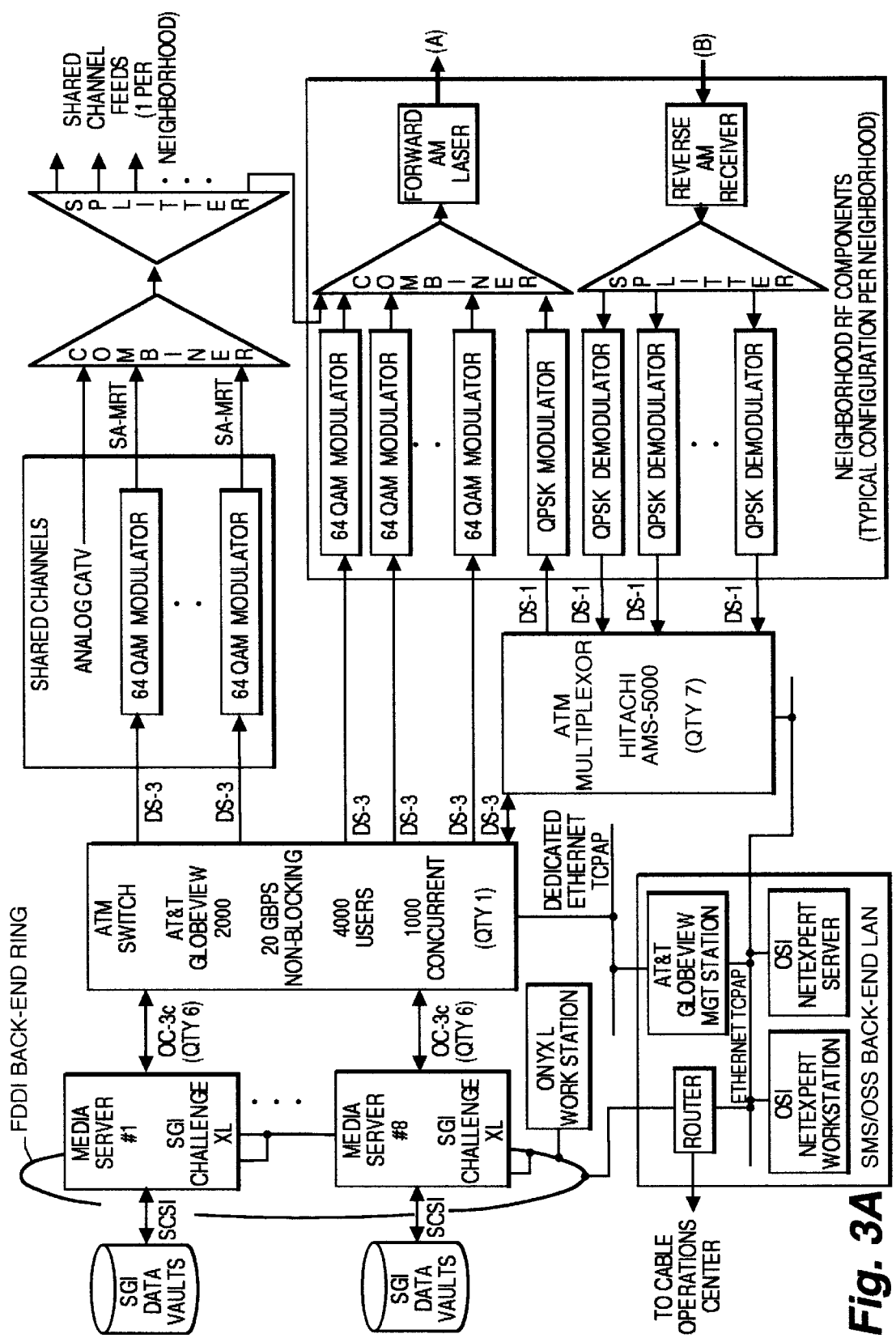
FIG. 3 presents another interactive communication system used by the invention.

FIG. 3 presents another interactive entertainment system used by the invention. A description of this interactive entertainment system is provided in the United States Application entitled "A Method For Message Addressing In A Full Service Network," filed on Dec. 14, 1995, and assigned to the assignee of the present application. The disclosure of this application is incorporated in the present application by reference.

Figure 4:
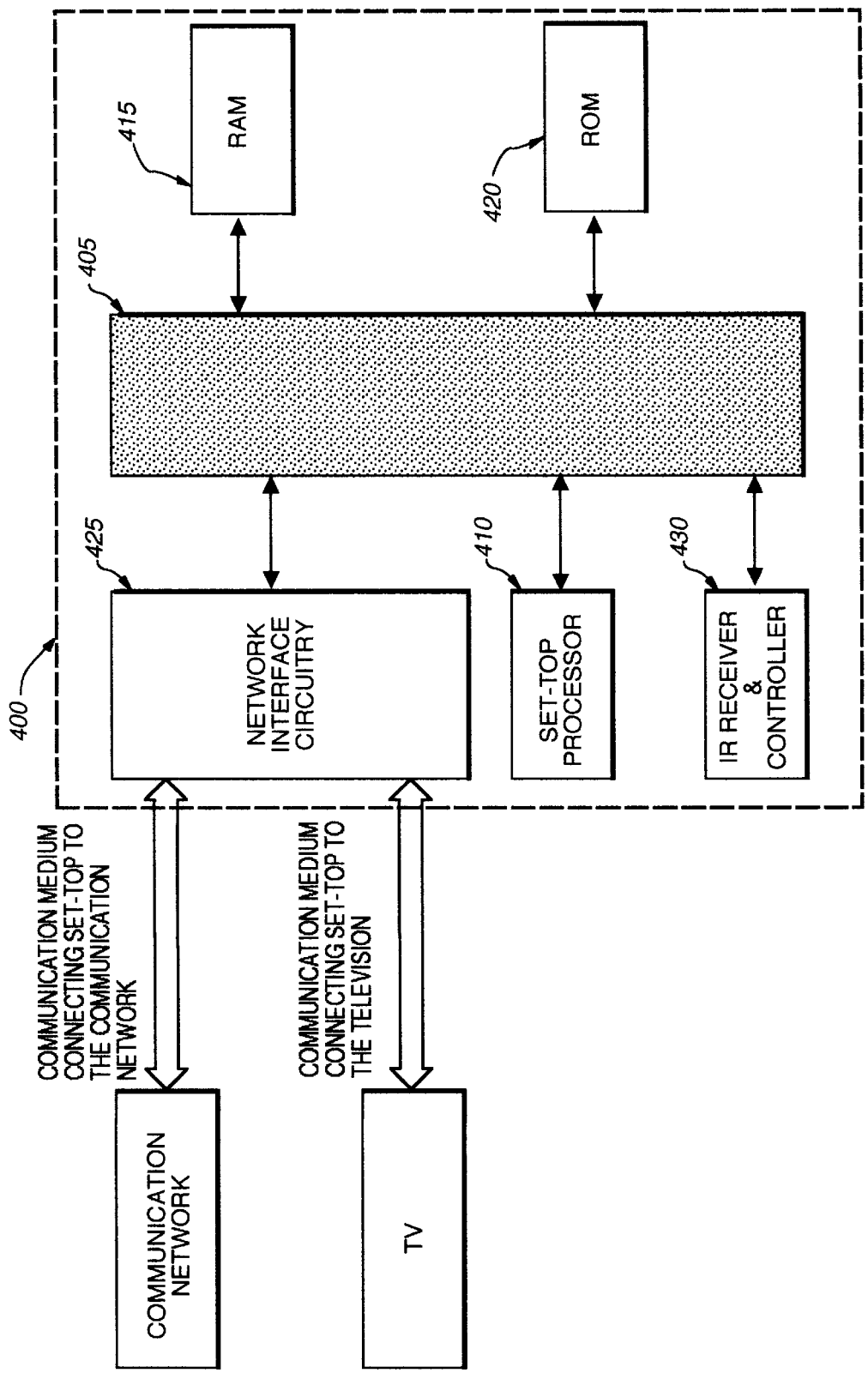
FIG. 4 presents a home set-top terminal used by the invention.

FIG. 4 presents a home terminal set-top 400 used by the invention. As mentioned above, the set-top device controls the operation of its corresponding television. In addition, the set-top (1) establishes a communication link between the television viewer and the service source, (2) presents, via the television, selectable programming options provided by the service source to the viewer, and (3) relays program selections from the viewer to the service source.

As shown in FIG. 4, set-top 400 includes internal bus 405, processor 410, random access memory (RAM) 415, read-only memory (ROM) 420, network interface 425, and infrared (IR) controller 430. Bus 405 represents the collective communication interface between the numerous internal modules of set-top 400. In addition, this set-top uses processor 410 for processing digital signals, and thereby managing the operation of the set-top.

Processor 410 is directed by the software and firmware instructions that respectively reside in RAM 415 and ROM 420. Specifically, in one embodiment of the invention, set-top 400 utilizes RAM 415 to store a source code necessary for the operation of the invention (i.e., set-top 400 utilizes the software residing in RAM 415 to direct the invention's display of promotional presentations by guiding the actions of processor 410). In another embodiment of the invention, the firmware instructions (i.e., the source code residing in ROM 420) direct the invention's display of promotional presentations. Set-top 400 also utilizes RAM 415 to store temporary variables or other intermediate information during the operation of processor 410.

As further shown in FIG. 4, set-top 400 also includes network interface 425, which represents all interface circuitry utilized by set-top 400 for communicating to the network or the television through external communication media (such as coaxial cables). Finally, set-top 400 includes IR controller 430 for receiving and decoding communications from a remote control operated by the viewer.

Figure 5:
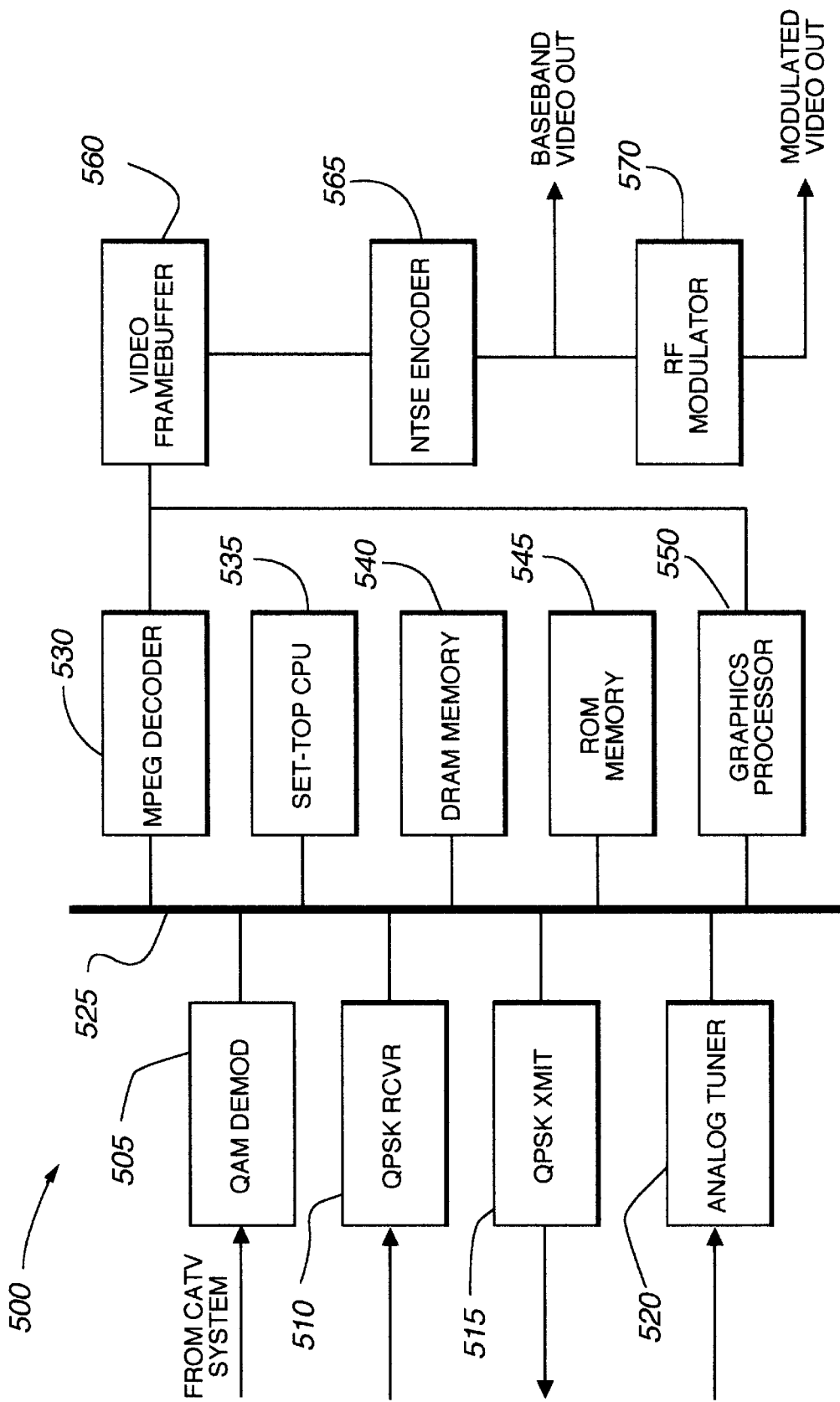
FIG. 5 presents another home set-top terminal used by the invention.

FIG. 5 presents another embodiment of home terminal set-top 120 used by the invention. Broadly, set-top 500 comprises a number of processing and interface elements. To support the range of channels available to the set-top, several elements may be included: QAM tuner/demodulator 505, QPSK receiver 510, QPSK transmitter 515, and analog tuner 520.

In one embodiment, QAM demodulator 505 receives digitally compressed services transmitted in the 500 Mhz to 735 Mhz band of frequencies. The set-top may be designed to decompress MPEG-1 programming delivered in 64-QAM, 12 MHz channels. QAM demodulator 505 receives Scientific-Atlanta Multi-Rate Transport (SA-MRT) encoded data, a forward error correction scheme designed to accomplish both random and burst error protection. This data is then error corrected and the VCI is filtered to select data which is specifically addressed to the set-top. It will be appreciated that more than one QAM demodulator could be used in the set-top in order to tune to more than one digital channel at a time.

In one embodiment, QPSK receiver 510 is tuned to the forward control channel to receive control messages from the head end, processing 1.5 MHz channels at DS1 data rates. A unique forward control channel has been defined for each neighborhood such that all the set-tops in a particular neighborhood can be controlled from a single broadcast command. This forward channel is assigned a fixed channel and given a dedicated tuner in the set-top.

QPSK transmitter 515 is used to send control and data packets from the set-top to the head end over a reverse channel. QPSK transmitter may be a TDMA burst-mode transmitter designed to process 1.5 MHz channels between 900 MHz and 975 MHz at DS1 data rates. On one embodiment, two such QPSK transmitters could be employed in a set-top design where one transmitter is dedicated to reverse control communications and another transmitter dedicated to high-speed communications for additional bandwidth.

Analog tuner 520 receives standard 6 MHz NTSC analog channels transmitted from 54 to 500 MHz. Set-top processing allows for digital services to be superimposed over the analog content. For example, graphics or text overlays may be added to the video and digitized audio can be used to achieve better synchronization with the video. Thus, the feed from the analog tuner may either be directly input into the video input of the television or the digital services may be processed by the set-top. As noted, the downloading of application data may be accomplished by transmitting it over the vertical blanking interval (VBI) of the standard NTSC analog television broadcast.

These interface components are electrically coupled to processing components via set-top bus 525. The processing components include MPEG decoder 530, set-top CPU 535, DRAM 540, ROM 545, graphics processor 550, video framebuffer 560, NTSC encoder 565, and RF modulator 570. In one embodiment, ROM memory 545 contains a "native" set-top operating system, together with device drivers needed to interface with the subscriber television as well as driving an infrared transceiver (not shown) to accept subscriber selection and input. ROM 545 also may contain a number of libraries for facilitating the processing of services at the set-top. These libraries include a multimedia library, a graphics library, and a run-time and service library.

Executing together on the set-top CPU 535 are the run-time environment and applications that are downloaded from the head end. As noted above, there are a number of ways in which such applications and their associated environments are downloaded (e.g. via multiple digital tuners or via the vertical blanking interval in the NTSC analog broadcast). While downloading, the set-top could be receiving service. As the set-top is receiving service, downloaded instruction and data are stored in a storage unit such as DRAM memory 540 or other storage. When the downloading is complete, the set-top CPU 535 may allow the running of execution of the environment and application while service is continuing.

For example, as the subscriber is watching a home shopping channel over an analog channel, a interactive graphics application could be downloaded from the head end to allow the user to order any particular item currently showing on the channel. The head end would download both the ordering application and its environment to the subscriber's set-top. Once downloaded, the set-top CPU would run both the environment and application at the same time the analog broadcast is continuing.

Figure 6A:
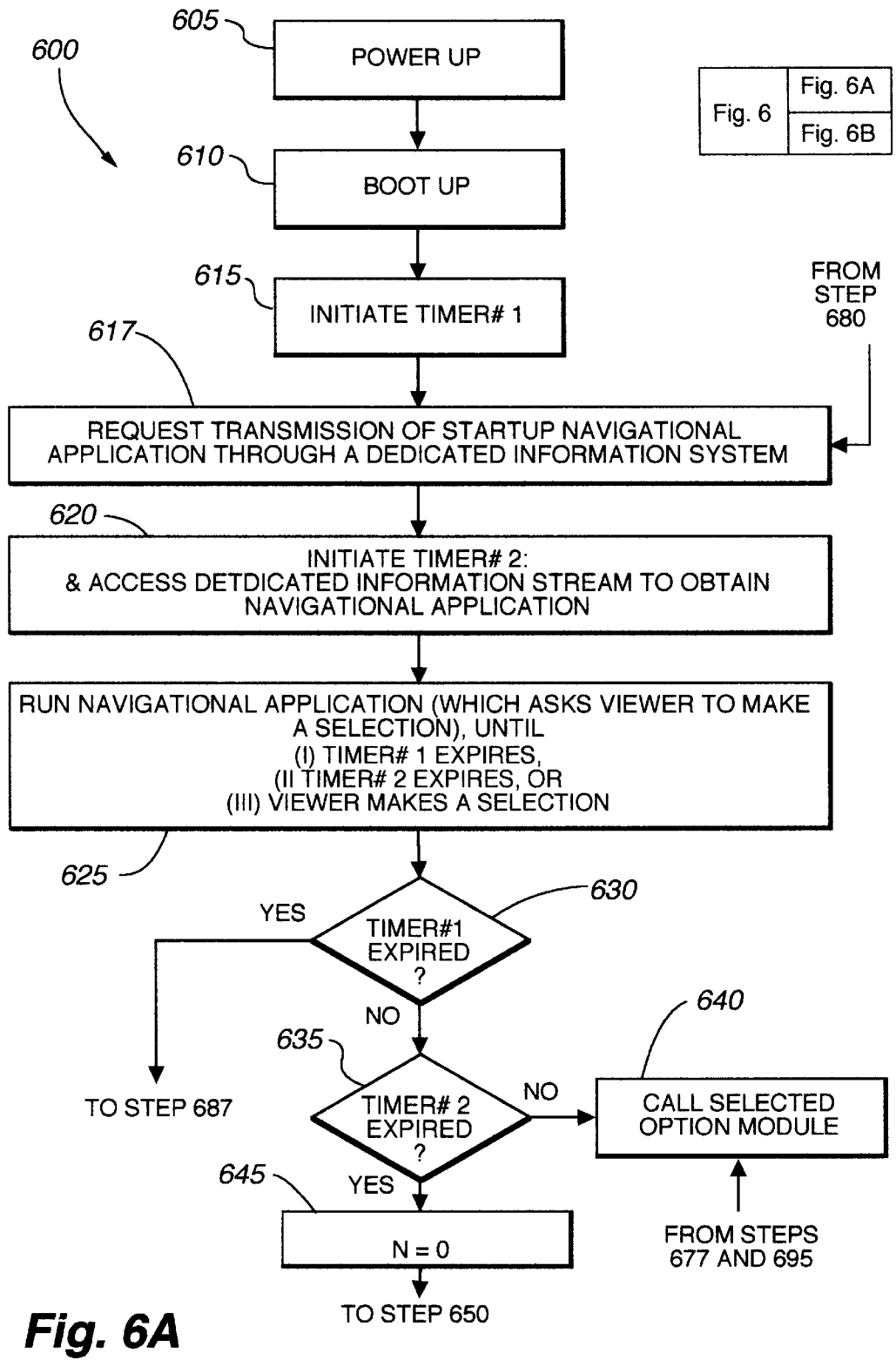
FIG. 6 presents one embodiment of the invention for playing promotional presentations of selectable options from a navigational menu, in response to the viewer's inactivity.
Figure 6B:
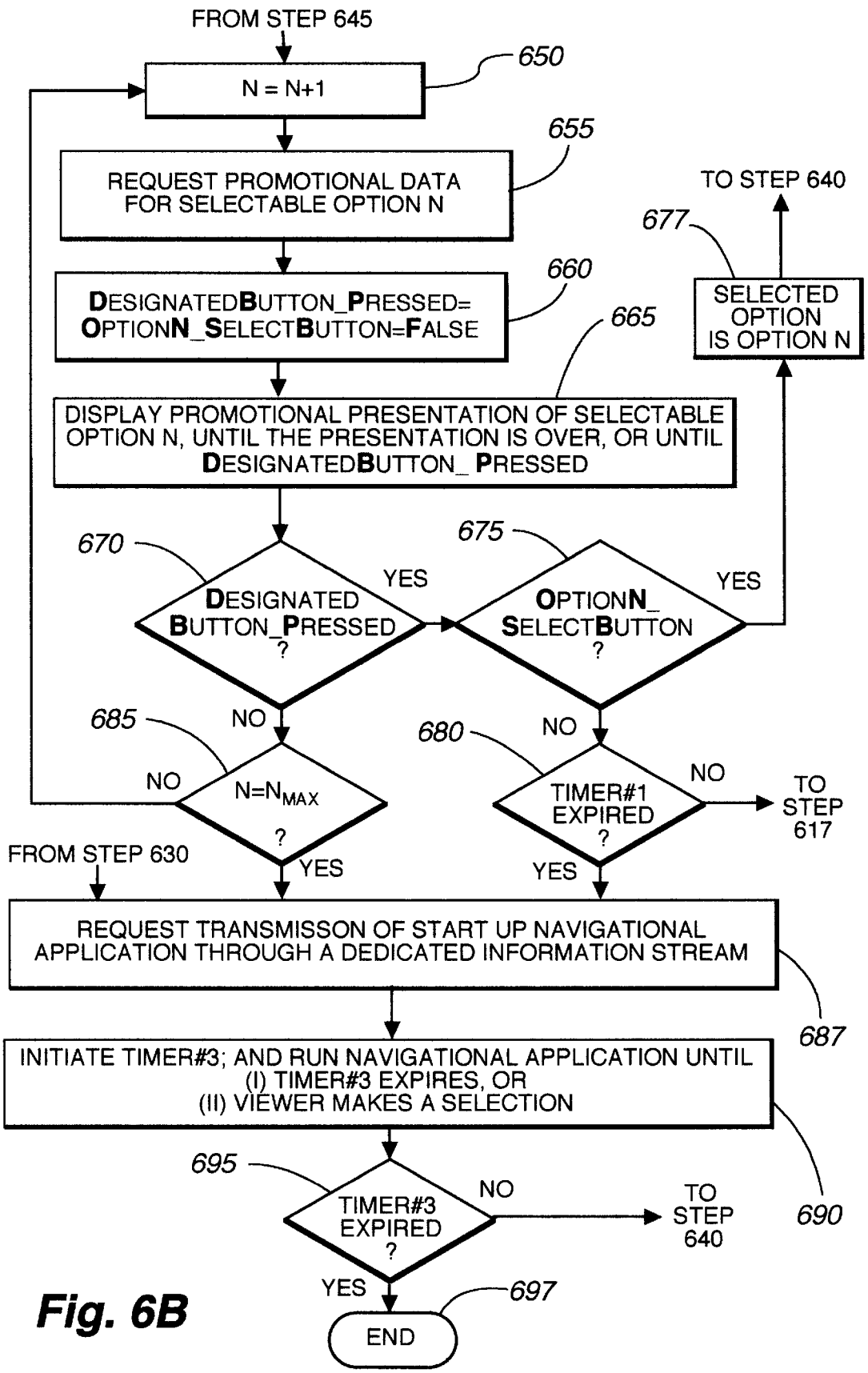

FIG. 6 presents one embodiment of the invention for playing promotional presentations of selectable options from a navigational menu, in response to the viewer's inactivity. This embodiment of the invention can be partly implemented as a software or a firmware code of the set-top. The initial step in the flowchart of FIG. 6 is the power up step 605. At this step, the viewer turns on the television and the set-top.

The process then transitions to step 610. This step is the boot-up step, during which the set-top firmware directs the set-top to perform boot-up operations. These operations include power-up self test operations and set-top hardware initialization operations. Also, at step 610, the set-top boot-up data directs the set-top to a shared information stream used by the service source for constantly broadcasting boot-up operating system to the home terminal nodes.

At step 615, the process then initiates a first timer indicating the time elapsed from the initial presentation of the navigational menu to the viewer. Next, at step 617, the received operating system causes the set-top to request the service source to transmit a start-up navigational application through a dedicated information stream. The process then transitions to step 620, where it (1) initiates a second timer indicating the time elapsed from the beginning of each presentation of the navigational application to the viewer, and (2) accesses the dedicated information stream to obtain the start-up navigational application. In one embodiment of the invention, the set-top receives the dedicated information stream assignment through an information stream used by the service source to transmit address specific control data to the set-tops.

Both the timers are similar in that they can be either count up or count down timers, which expire when they reach predetermined expiration values. However, the timers differ in that the second timer has a shorter duration than the first timer, because, as further discussed below, the time for each single presentation of the navigational menu to the viewer (i.e., the time measured by the second timer) should be less than the total time allotted for the viewer to select an option from the navigational menu.

At step 625, the set-top then causes the television to display a set of selectable, interactive and broadcast options to the viewer, by (1) decoding the received, start-up navigational data, and (2) transmitting decoded video signals to the television. In one embodiment of the invention, the decoded navigational data translates into a multi-faced, rotating carousel menu, which presents one or more selectable options on each of its faces. These selectable options could include a venue for shopping, a venue for newly released movies, a venue for particular types of cable programming, etc.

The process remains at step 625 until (1) the first timer expires, (2) the second timer expires, or (3) the viewer makes a selection. From step 625, the process transitions to step 630, during which a determination is made whether the first timer has expired. At least for the first showing of the navigational menu, the process determines that the first timer has not expired, because, if either of the timers expires during the first showing of the navigational application, it will be the second timer which has a shorter duration than the first timer. However, if the process returns to step 625 after the initial presentation of the navigational menu, then the inquiry at step 630 might be answered in the positive, which would cause the process to transition to step 687 to request receiving the navigational application one last time over a dedicated information stream.

If, at step 630, it is determined that the first timer has not expired, then the process transitions to step 635, during which a decision is made as to the status of the second timer. If the second timer has not expired, then the process determines that it left step 625 because the viewer selected one of the options from the navigational menu. Therefore, the process transitions to step 640 to call up the selected option module, in order to request the transmission of start up information concerning the selected option from the service source through a dedicated information stream. One embodiment of a selected option module is described below by reference to FIG. 7.

Alternatively, if, at step 635, it is determined that the second timer has expired, an option count N is set to zero at step 645. From step 645, the process transitions to step 650, during which the option count is incremented by one. At step 655, the set-top then requests the service source to transmit promotional data for selectable option N through a dedicated information stream.

The process then sets Boolean variables DesignatedButton_Pressed and OptionN_SelectButton to false, at step 660. All or some of the buttons on the remote control are designated buttons which, when pressed by the viewer, enable the viewer either (1) to return to the presentation of the navigational application, or (2) to select option N. In addition, one or more of the designated buttons are identified as option N select button for selecting option N. Consequently, the DesignatedButton_Pressed variable is used to determine whether, during step 665, the viewer presses one of the designated buttons. In addition, the OptionN_SelectButton variable is used to determine whether, during step 665, the viewer presses the select button to select option N (whose promotional video is displayed at step 665).

At step 665, the set-top causes the television to display a promotional video presentation of the selectable option N, by decoding the requested promotional information, and transmitting decoded video signals to the television. The process remains at step 665 until the presentation is over or until the user presses one of the designated selection button (which, in turn, would change the value of the DesignatedButton_Pressed variable to true).

From step 665, the process transitions to step 670, during which the value of the Boolean variable DesignatedButton_Pressed is examined. If the DesignatedButton_Pressed variable is true, then the process transitions to step 675. At this step, a decision is made as to the value of the OptionN_SelectButton variable. If the OptionN_SelectButton variable is true, then the process transitions (1) initially to step 677 to identify option N as a selected option, and then (2) to step 640 to call up the selected option module in order to request the service source to transmit start up information concerning the selected option through a dedicated information stream.

If the OptionN_SelectButton variable is determined to be false at step 675, the process determines that the viewer pressed a designated button (other than the option select button or buttons) in order to return to the navigational menu. The process then transitions to step 680, where a decision is made as to the status of the first timer. If the first timer has expired, the process transitions to step 687 to request the service source to transmit the navigational application one last time over a dedicated information stream. However, if, at step 680, a determination is made that the first timer has not expired, the process transitions to step 617 to restart the presentation of the navigational menu.

On the other hand, if the DesignatedButton_Pressed variable is determined to be false at step 670, the process determines that step 665 was exited because the viewer did not make any selections during the entire promotional presentation of selectable option N. Therefore, the process transitions to step 685, during which a decision is made as to the value of the option count N. If this count is less than the total number of selectable options $N_{MAX}$, the process transitions back to step 650, in order to increment the option count N by one, and to show the promotional presentation of the next option.

However, if the option count N is equal to the total number of selectable options $N_{MAX}$, the process determines that the viewer did not make a selection during the showing of all the promotional presentations for all of the selectable options. Consequently, the process transitions to step 687 to request the service source to transmit the navigational application one last time over a dedicated information stream. Next, at step 690, the process (1) initiates a third timer, and (2) displays the navigational menu again, until the third timer expires or the viewer makes a selection.

From step 690, the process transitions to step 695. At this step, a decision is made as to the status of the third timer. If this timer has not expired, the process determines that the viewer has made a selection. Thus, it transitions to step 640 to call up the selected option module in order to request start up information concerning the selected option from the service source through a dedicated information stream. Finally, if, at step 695, the process determines that the timer has expired, the process transitions to step 697, where it terminates its operation in order to save the system's resources.

Figure 7A:
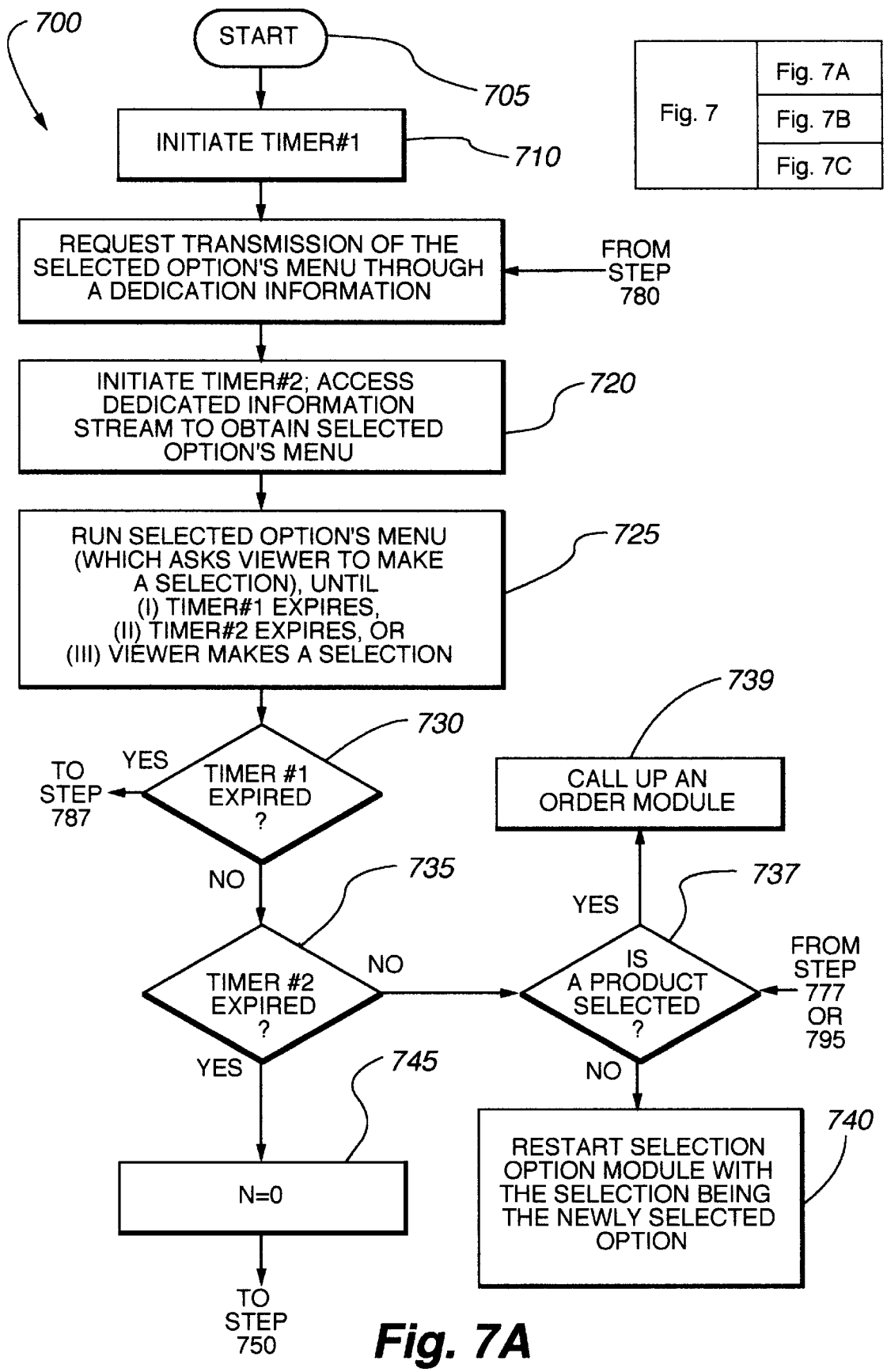
FIG. 7 presents one embodiment of the invention for playing promotional presentations of selectable options from menus other than the navigational menu, in response to the viewer's inactivity.
Figure 7B:
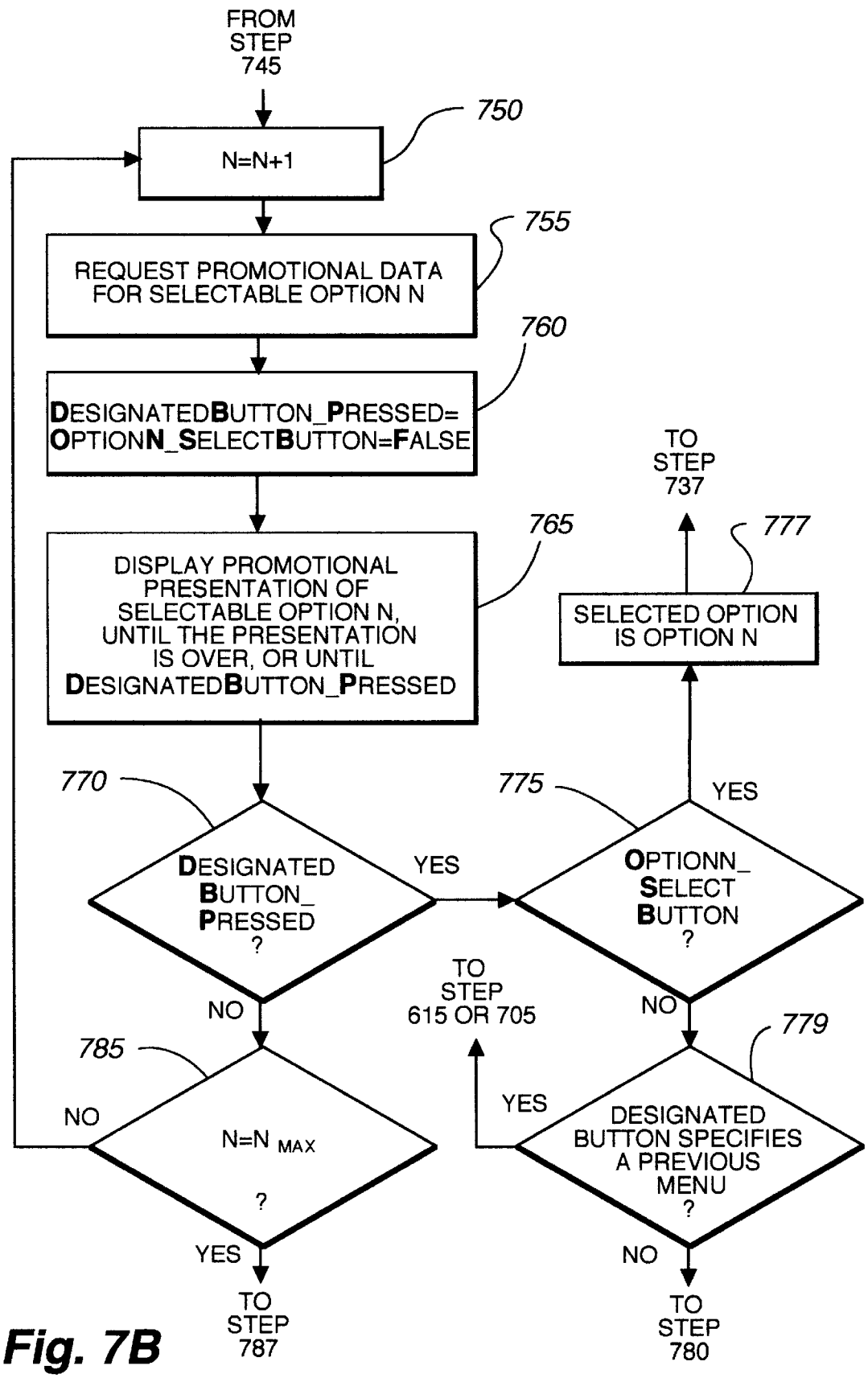
Figure 7C:
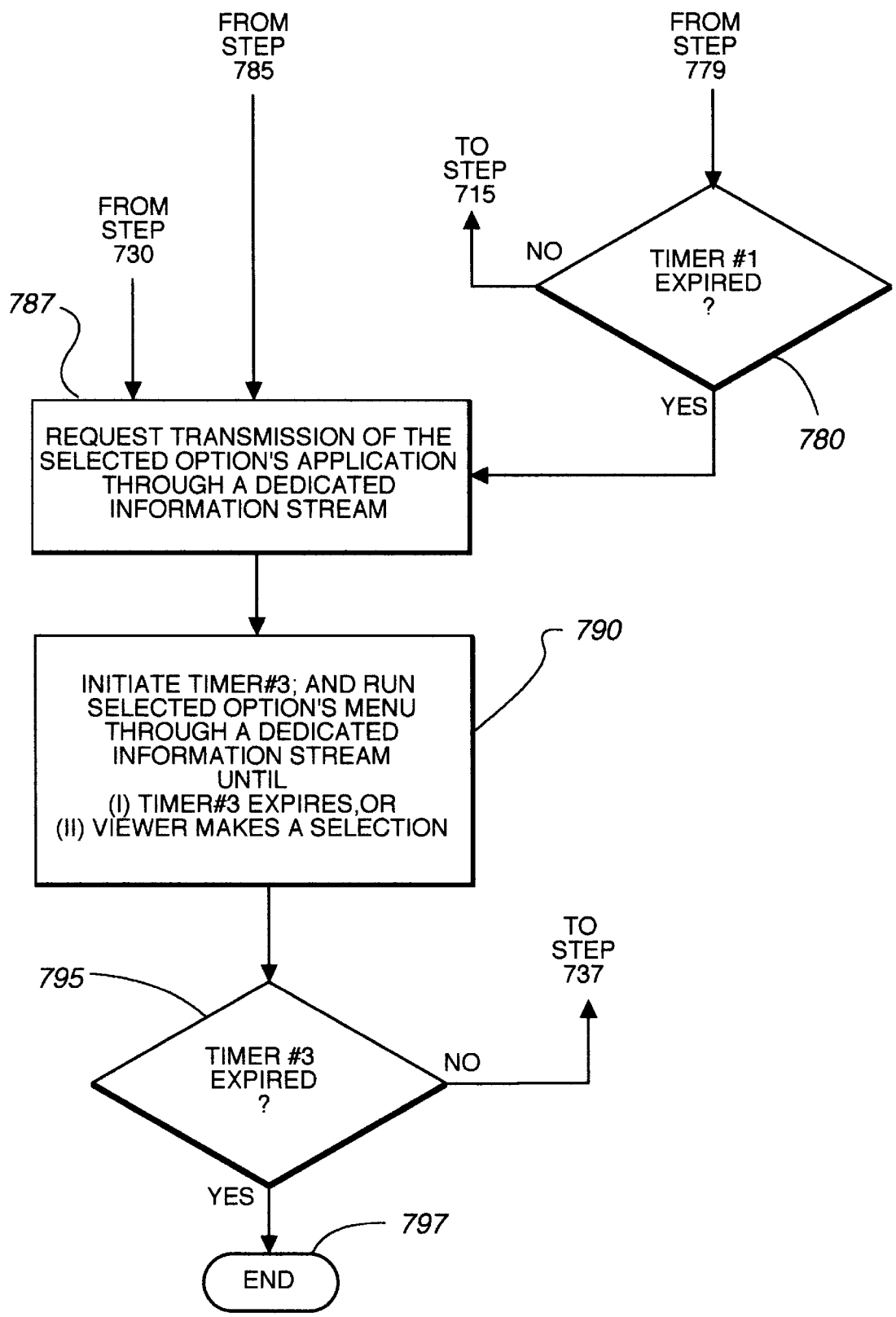

FIG. 7 presents one embodiment of the invention for playing promotional presentations of selectable options from menus other than the navigational menu, in response to the viewer's inactivity. Specifically, for one embodiment of the invention, process 700 serves as a selected option module for options which, when selected from one list of selectable options (i.e., from one menu), provide a viewer with another list of selectable options (i.e., with another menu). This module can be implemented as a software or a firmware code of the set-top.

The initial step of process 700 is start step 705. At this step, selected option module 700 is initiated in response to a viewer who selects an option from a previous menu. Examples of start step 705 are (1) step 640 of navigational process 600 of FIG. 6, and (2) step 740 of selected option module 700.

The process then transitions to step 710 to initiate a first timer indicating the time elapsed from the initial presentation of the selected option's menu to the viewer. Next, at step 715, the process causes the set-top to request the service source to transmit the selected option's application through a dedicated information stream. The process then transitions to step 720, where it (1) initiates a second timer indicating the time elapsed from the beginning of each presentation of the selected option's menu to the viewer, and (2) accesses the dedicated information stream to obtain the selected option's application. As mentioned before, in one embodiment of the invention, the set-top receives the dedicated information stream assignment through an information stream used by the service source to transmit address specific control data to the set-tops.

Both the timers are similar in that they can be either count up or count down timers, which expire when they reach predetermined expiration values. However, the timers differ in that the second timer has a shorter duration than the first timer, because, as further discussed below, the time for each single presentation of the selected option's menu to the viewer (i.e., the time measured by the second timer) should be less than the total time allotted for the viewer to choose a selection from the selected option's menu.

At step 725, the set-top then causes the television to display a set of selectable, interactive and broadcast options to the viewer, by (1) decoding the selected option's data, and (2) transmitting decoded video signals to the television. In one embodiment of the invention, the decoded selected option's menu is presented in an interactive video format.

The process remains at step 725 until (1) the first timer expires, (2) the second timer expires, or (3) the viewer makes a selection from the selected option's menu. From step 725, the process transitions to step 730, during which a determination is made whether the first timer has expired. At least for the first showing of the selected option's menu, the process determines that the first timer has not expired, because, if either of the timers expires during the first showing, it will be the second timer which has a shorter duration than the first timer. However, if the process returns to step 725 after the initial presentation of the selected option's menu, then the inquiry at step 730 might be answered in the negative, which would cause the process to transition to step 787 to request receiving the selected option's application one last time over a dedicated information stream.

If, at step 730, it is determined that the first timer has not expired, then the process transitions to step 735, during which a decision is made as to the status of the second timer. If the second timer has not expired, then the process determines that it left step 725 because the viewer chose one of the selections from the selected option's menu. Therefore, the process transitions to step 737 to determine if the selection is (1) a product, or (2) another option corresponding to another set of selectable options.

If the selection corresponds to a selection of a product, the process transitions to step 739 to call up an order module. This order module establishes a dedicated communication link between the viewer and the service source, in order to allow the viewer to purchase the selected product. However, if the selection is a selection of another options, the process transitions to step 740 to restart the selected option module, so as to request the service source to transmit start up information concerning the newly selected option through a dedicated information stream.

Alternatively, if, at step 735, it is determined that the second timer has expired, an option count N is set to zero at step 745. From step 745, the process transitions to step 750, during which the option count is incremented by one. At step 755, the set-top then requests the service source to transmit promotional data for selectable option N (from the selected option's menu) through a dedicated information stream.

The process then sets Boolean variables DesignatedButton_Pressed and OptionN_SelectButton to false, at step 760. All or some of the buttons on the remote control are designated buttons which, when pressed by the viewer, enable the viewer either (1) to return to the presentation of the selected option's menu, (2) to return to the presentation of earlier menu's (such as the navigational menu), or (3) to select option N from the selected option's menu.

In addition, one or more of the designated buttons are identified as option N select button for selecting option N from the selected option's menu. Consequently, the DesignatedButton_Pressed variable is used to determine whether, during step 765, the viewer presses one of the designated buttons. In addition, the OptionN_SelectButton variable is used to determine whether, during step 765, the viewer presses the select button to select option N (whose promotional video is displayed at step 765).

At step 765, the set-top causes the television to display a promotional video presentation of the selectable option N, by decoding the requested promotional information, and transmitting decoded video signals to the television. The process remains at step 765 until the presentation is over or until the user presses one of the designated selection button (which, in turn, would change the value of the DesignatedButton_Pressed variable to true).

From step 765, the process transitions to step 770, during which the value of the Boolean variable DesignatedButton_Pressed is examined. If the DesignatedButton_Pressed variable is true, then the process transitions to step 775. At this step, a decision is made as to the value of the OptionN_SelectButton variable. If the OptionN_SelectButton variable is true, then the process transitions (1) initially to step 777 to identify option N as a new selection, and then (2) to step 737 to determine if the selection is a selection of a product or a selection of another option corresponding to another set of selectable options.

Alternatively, if the OptionN_SelectButton variable is determined to be false at step 775, the process determines that the viewer pressed a designated button other than the option select button or buttons. Consequently, the process transitions to step 779 to determine the menu associated with the pressed designated button. If the pressed designated button corresponds to a previous menu, then the process (1) returns to step 615, if the selected menu is the navigational menu, or (2) identifies the option corresponding to the pressed designated button as the newly selected option and returns to step 705, if the selected menu is a menu other than navigational menu If, at step 779, the process determines that the pressed designated button corresponds to the selected option's menu, the process transitions to step 780, where a decision is made as to the status of the first timer. If the first timer has expired, the process transitions to step 787 to request the service source to transmit the selected option's menu one last time over a dedicated information stream. However, if, at step 780, the process determine that the first timer has not expired, the process transitions to step 715 to restart the presentation of the selected option's menu.

On the other hand, if the DesignatedButton_Pressed variable is determined to be false at step 770, the process determines that step 765 was exited because the viewer did not make any selections during the entire promotional presentation of selectable option N. Therefore, the process transitions to step 785, during which a decision is made as to the value of the option count N. If this count is less than the total number of selectable options $N_{MAX}$, the process transitions back to step 750, in order to increment the option count N by one, and to show the promotional presentation of the next option.

However, if the option count N is equal to the total number $N_{MAX}$ of selectable options from the selected option's menu, the process determines that the viewer did not make a selection during the showing of all the promotional presentations for all of the selectable options. Consequently, the process transitions to step 787 to request the service source to transmit the selected option's application one last time over a dedicated information stream. Next, at step 790, the process (1) initiates a third timer, and (2) displays the selected option's menu again, until the third timer expires or the viewer makes a selection.

From step 790, the process transitions to step 795. At this step, a decision is made as to the status of the third timer. If this timer has not expired, the process determines that the viewer has made a selection. Thus, it transitions to step 737 to determine if the selection is a selection of a product or a selection of another option corresponding to another set of selectable options. Finally, if, at step 795, the process determines that the timer has expired, the process transitions to step 797, where it terminates its operation in order to save the systems resources.

As mentioned before, in one embodiment of the invention, the decoded selected option's menu is presented in an interactive video format. For example, if the selected option is a shopping application, then the shopping menu can be presented as a video presentation of an interactive mall, where the stores in a mall represent selections from the shopping menu. In addition, once a user selects a store in the shopping mall, the user can be presented with video presentation of the store, in order to select one of its departments.

In turn, if the user selects one of the departments of the store, the user can be presented with a video presentation of the selections in that department. This format for presenting a viewer with interactive videos regarding the selected options can continue until the viewer is presented with a number of products. It is at this stage that the viewer's selection of a particular option results in the calling of the order module.

As apparent from the discussion above, the invention is advantageous because it provides a method and apparatus for enticing a passive television viewer by displaying promotional videos of selectable options, if the viewer does not make a selection within a predetermined amount of time after being presented with the selectable options. In addition, the invention's automatic passive mode can be used (1) to give the consumers an overview of the system and the options available to them, (2) to inform consumers of an added service or feature, and (3) to entice consumers to actively engage interactive applications that they would not otherwise use. Thus, the invention enhances the usability of the interactive system by appealing to different types of users.

While the invention has been described with reference to numerous specific details, one of ordinary skill in the art would recognize that the invention can be embodied in other specific forms without departing from the spirit of the invention. For example, one of ordinary skill in the art would recognize that, although the invention has been described by reference a home terminal node that includes a set-top terminal and a television, alternative embodiments of the invention utilize home terminal nodes that include a cable modem and a computer. In these embodiments, a display device of the computer is used for displaying the transmitted programming.

In addition, even though one embodiment of the invention has been described by reference to a terrestrial communication network, one of ordinary skill in the art would realize that an alternative embodiment of the invention utilizes a satellite communication system. Thus, one of ordinary skill in the art would understand that the invention is not to be limited by the foregoing illustrative details, but rather is to be defined by the appended claims.

I claim:

1. A method for enticing a passive television viewer viewing a television display controlled by a computer, said method comprising the computer implemented steps of:

presenting said viewer with a promotional presentations having a first set of selectable options, each option identifying an additional promotional presentation;

allowing said viewer to select an option from said first set of selectable options;

determining whether or not said viewer has selected an option from said first set of selectable options;

playing computer selected promotional presentations identified by the options from said first set of selectable options, if said viewer does not select an option from said first set of selectable options; and playing a viewer selected promotional presentation identified by an option selected by said viewer from said first set of selectable options, if said viewer does select an option from said first set of selectable options.

2. The method of claim 1, wherein said step for playing computer selected promotional presentations includes the step of presenting said viewer a first promotional presentation of a first option, if said viewer does not select an option from said first set of selectable options within a first predetermined amount of time.

3. The method of claim 2, wherein said step for playing computer selected promotional presentations further includes the step of presenting said viewer a second promotional presentation of a second option, if said viewer does not make a selection within a second predetermined amount of time after said first promotional presentation starts.

4. The method of claim 1 further comprising the step of allowing said viewer to select an option from a second set of selectable options presented during the playing of a promotional presentation identified by an option selected from said first set of selectable options.

5. The method of claim 1 further comprising the step of presenting said first set of selectable options again, if during said playing of said promotional presentations said viewer requests to review said first set of selectable options again.

6. The method of claim 1 further comprising the step of providing a viewer a first predetermined amount of time to make a selection from said first set of selectable options before terminating said promotional presentations of options from said first set of selectable options.

7. The method of claim 1 further comprising the step of presenting said viewer with a second set of selectable options from a viewer-selected promotional presentation of an option selected by said viewer from said first set of selectable options.

8. The method of claim 4 further comprising the step of playing promotional presentations of options from said second set of selectable options, if said viewer does not select an option from said second set of selectable options.

9. The method of claim 8, wherein said step for playing promotional presentations from said second set of options includes the step of presenting said viewer a second promotional presentation of a second option from said second set of options, if said viewer does not select an option from said second set of selectable options within a first predetermined amount of time.

10. A computer program for executing a computer process, said computer program being storage medium readable by a computing system controlling a television and encoding a program of instructions for enticing a passive television viewer, said computer process comprising the steps of:

presenting said viewer with a first set of selectable options, said options representing calls to Promotional presentation modules;

determining whether or not said viewer makes a selection of an option from said first set of selectable options;

if said viewer does not select an option from said first set of selectable options within a first predetermined amount of time, selecting a first option with the computing system and playing a first promotional presentation called by the first option from said first set of selectable options; and if said viewer does select an option from said first set of selectable options within the first predetermined amount of time, playing a promotional presentation called by the option selected by the viewer.

11. The computer program of claim 10, wherein said step of playing the first promotional presentation comprises the steps of:

requesting promotional data concerning said first option from a service source through a communication network;

receiving said promotional data from said service source through said communication network.

12. The computer program of claim 10 further comprising the step of playing a second promotional presentation of a second option from said first set of selectable options, if said viewer does not make a selection within a second predetermined amount of time after said first promotional presentation starts.

13. The computer program of claim 12, wherein said second predetermined amount of time equals the duration of the first promotional presentation.

14. The computer program of claim 12, wherein said step for playing said second promotional presentation comprises:

requesting second promotional data concerning said second option from said service source through said communication network;

receiving said second promotional data from said service source through said communication network.

15. The computer program of claim 10, wherein said viewer has to press a designated button on a remote control to make a selection.

16. The computer program of claim 15, wherein each button on said remote control is a designated button.

17. The computer program of claim 15, wherein only some buttons on said remote control are designated buttons.

18. The computer program of claim 15, wherein, if during said playing of said first promotional presentation said viewer presses a first designated button on said remote control, said computer process calls a first option.

19. The computer program of claim 18, wherein if during said playing of said first promotional presentation said viewer presses a second designated button on said remote control, said computer process presents said first set of selectable options again.

20. The computer program of claim 10, wherein if during said playing of said first promotional presentation said viewer requests a return to said first set of selectable options, said computer process presents said first set of selectable options again.

21. The computer program of claim 20, wherein if said viewer does not select, within a second predetermined amount of time, one of said first set of selectable options after said first set of options are presented again, said computer process further comprises the step of playing a second promotional presentation of a second option from said first set of selectable options.

22. The computer program of claim 21, wherein after detecting that said viewer has not made a selection within said second predetermined amount of time, but before said step for playing said second promotional presentation, said computer process comprises the steps of:

determining if a third predetermined amount of time has elapsed since the viewer was initially presented with said first set of options, if said third predetermined amount of time has elapsed, informing the viewer that he has a fourth predetermined amount of time to make a selection from said first set of selectable options before terminating said presentation of said first set of selectable options.

23. The computer program of claim 20, wherein if said viewer does not select, within a second predetermined amount of time, one of said first set of selectable options after said first set of options are presented again, said computer program further comprises the step of playing said first promotional presentation of said first option from said first set of selectable options.

24. The computer program of claim 23, wherein if said viewer has not made a selection within said second predetermined amount of time, and before said step for playing said first promotional presentation, said computer process further comprises the steps of:

determining if a third predetermined amount of time has elapsed since the viewer was initially presented with said first set of options, if said third predetermined amount of time has elapsed, informing the viewer that he has a fourth predetermined amount of time to make a selection from said first set of selectable options before terminating said presentation of said first set of selectable options.

25. The computer program of claim 10 further comprising the step of presenting said viewer with a second set of selectable options corresponding to said selected option, if said viewer selects an option from said first set of selectable options.

26. The computer program of claim 25 further comprising the step of playing a first promotional presentation of a first option from said second set of selectable options, if said viewer does not select an option from said second set of selectable options within a second predetermined amount of time.

27. An apparatus for enticing a passive television viewer, said apparatus comprising:

means for presenting said viewer with a first set of selectable options each option representing a promotional presentation to be called when a option is selected;

means for determining whether or not said viewer selects an option from said first set of selectable options; and means responsive to said determining means for causing said presenting means to play promotional presentations of options from said first set of selectable options, if said viewer does not select an option from said first set of selectable options.

28. The apparatus of claim 27, wherein said determining means comprises:

first means for determining if said viewer does not select an option from said first set of selectable options within a first predetermined amount of time; and means for directing said presenting means to present said viewer a first promotional presentation of a first option if said viewer does not select an option within said first predetermined amount of time.

29. The apparatus of claim 28, wherein said determining means comprises:

second means for determining if said viewer does not make a selection within a second predetermined amount of time after said first promotional presentation starts; and said directing means directing said presenting means to present said viewer a second promotional presentation of a second option if said viewer does not make a selection within said second predetermine amount of time.

30. The apparatus of claim 27 further comprising means for enabling said viewer to select an option during the playing of a promotional presentation of another option.

31. The apparatus of claim 27 further comprising:

means for determining if said viewer requests to review said first set of selectable options again; and means for presenting said first set of selectable options again, if during said playing of said promotional presentations said viewer requests to review said first set of selectable options again.

32. The apparatus of claim 27 further comprising means for providing a viewer a first predetermined amount of time to make a selection from said first set of selectable options before terminating said promotional presentations of options from said first set of selectable options.

33. The apparatus of claim 27 further comprising means for presenting said viewer with a second set of selectable options corresponding to an option selected by said viewer from said first set of selectable options.

34. The apparatus of claim 33 further comprising:

means for determining whether or not said viewer selects an option from said second set of selectable options; and means for playing promotional presentations of options from said second set of selectable options, if said viewer does not select an option from said second set of selectable options.

35. The apparatus claim 34, wherein said means for playing promotional presentations from said second set of options includes the step of presenting said viewer a second promotional presentation of a second option from said second set of options, if said viewer does not select an option from said second set of selectable options within a first predetermined amount of time.

36. A method for enticing an inactive television viewer that is viewing an interactive television display controlled by a computer to participate in interactive television activity by automatically playing one or more additional promotional presentations in response to viewer inactivity, and by playing a selected additional promotional presentation in response to viewer activity, the method comprising:

providing a television viewer a promotional television presentation with a plurality of options to be selected by the television viewer;

determining whether the television viewer is an active viewer or a passive viewer;

if the television viewer is an active viewer, displaying the one of the plurality of options selected by the television viewer; and if the television viewer is a passive viewer, automatically displaying a promotional presentation featuring one of the plurality of options that can be selected by the television viewer to attempt to entice the passive viewer to become an active viewer.

37. A method as defined in claim 36, wherein the operation of displaying a promotional presentation of a specific one of the plurality of options is performed sequentially for each of the plurality of options.

38. A method as defined in claim 36, wherein each promotional presentation relates solely to the specific one of the plurality of options.

39. A method as defined in claim 36, wherein the determining operation includes determining if the television viewer makes a selection within a predetermined time period.

\* \* \* \* \*